United States Patent Office 3,280,373
Patented Oct. 18, 1966

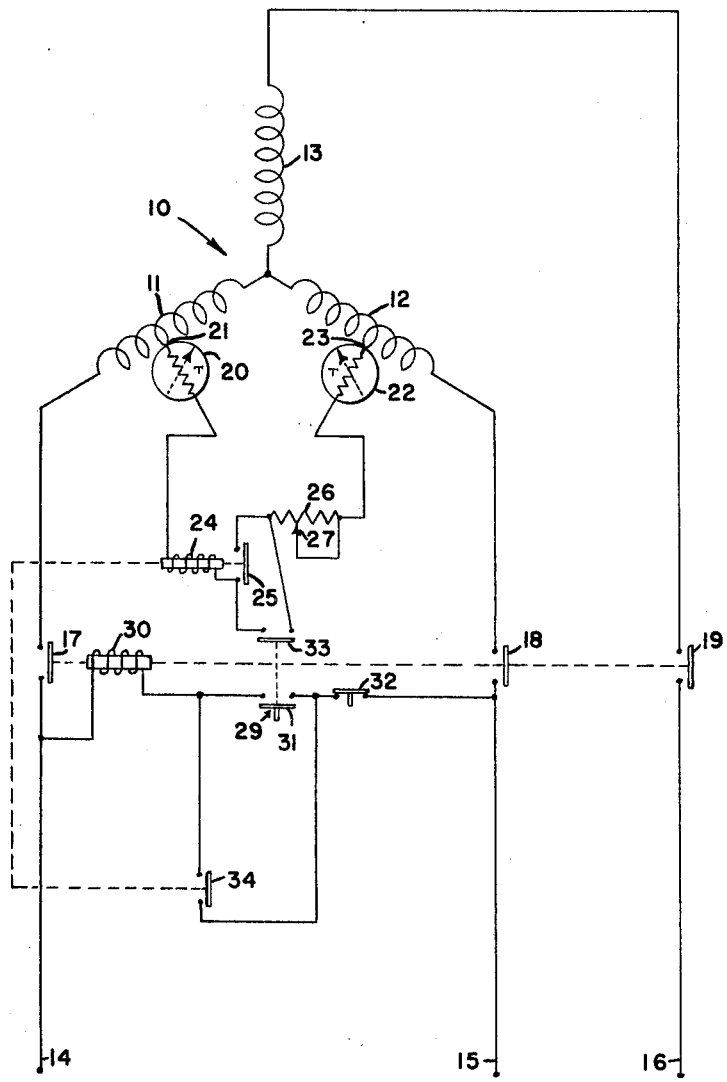

3,280,373
OVER-TEMPERATURE PROTECTION SYSTEM HAVING MEANS FOR SIMULATING THE TEMPERATURE RISE RATE OF A DYNAMOELECTRIC MACHINE AND WINDING
George B. Dabinett, Syracuse, N.Y., assignor to Carrier Corporation, Syracuse, N.Y., a corporation of Delaware
Filed Sept. 6, 1962, Ser. No. 221,800
1 Claim. (Cl. 317—13)

This invention relates to dynamoelectric machinery, and more particularly, it relates to providing improved over-temperature protection for dynamoelectric machinery.

One of the principal causes of failure of dynamoelectric machinery such as electric motors is the cumulative deterioration of the insulation in the windings due to excessive heating during periods of overload of the machine. In order to extend the life of an electric motor, therefore, it is customary practice to employ some type of over-temperature protection circuit to protect the machine from excessively high temperatures which cause thermal decomposition of the winding insulation.

Previously utilized over-temperature protection systems have frequently employed thermostatic switch elements or thermistors embedded in a motor winding, for example, to sense the existence of an over-temperature condition of the winding and to either take the motor off the line or to provide some type of warning of the existence of an excessive temperature condition. These over-temperature protection systems have not been altogether satisfactory because of the inherent thermal lag in the response of the temperature sensor. This thermal lag results in the temperature sensor failing to sense the existence of an over-temperature condition for a substantial period of time after the over-temperature condition occurs. This delay is often as long as ten to fifteen seconds after the existence of the over-temperature condition and results in the motor winding insulation being heated to a much higher temperature than is desirable.

In order to compensate for this thermal lag the over-temperature protection circuit is frequently designed to respond to some lower temperature than that against which it is desired to actually protect the motor. This technique may satisfactorily protect the motor against an initial overload such as a locked rotor condition which has a relatively high temperature rise rate, because the over-temperature protection system is set to operate so that when the temperature sensor reaches a certain lower temperature, the motor winding temperature is actually approaching a higher temperature against which it is designed to protect it. However, the over-temperature protection system is unable to distinguish between a high temperature rise rate occasioned by a locked rotor condition and a temperature condition occasioned by a normal running condition of the motor. In the latter case, temperature sensor temperature more closely follows the actual motor winding temperature and the motor protection circuit initiates the protection function at a temperature which is substantially lower than that at which the motor could safely operate. Consequently, a motor protected in this manner must be rated at a normal operating horsepower capacity which is substantially below that which the motor is safely capable of delivering in order to have satisfactory protection against a locked rotor condition.

Furthermore, a given horsepower capacity motor may be designed much more economically if the motor winding is permitted to have a high temperature rise rate than if it is required to have a low temperature rise rate. In actual practice, the permissible temperature rise rate for a motor winding is limited by the speed of response of the over-temperature protection system since conventional over-temperature protection systems do not respond as quickly as the rise rate of a high temperature rise rate motor winding. This often means that it is necessary to use a larger motor frame size or a more temperature resistant insulation class or a greater amount of copper in the motor winding than is otherwise needed in order to keep the temperature rise rate of the motor compatible with the temperature rise rate of the temperature protection system.

It is apparent that if a motor temperature protection system has a temperature rise rate that is substantially similar to the rise rate of the motor winding with which it is used, a motor incorporating such a system may be safely operated and rated close to its maximum actual capacity since no compensating provision need be made for temperature overshoot due to the thermal lag of the temperature sensor.

Accordingly, it is a principal object of this invention to provide improved over-temperature protection for dynamoelectric machinery.

It is a further object of this invention to provide an over-temperature protection system having a temperature rise rate which may be made substantially similar to that of the temperature rise rate of the machine with which it is used.

These and other objects of this invention are achieved in this illustrated preferred embodiment thereof by providing a temperature sensitive resistance element which may be secured directly to the electrical conductor or a motor winding in order to respond quickly to the temperature rise of the winding. In the instant invention, a current is passed through the temperature sensitive resistance element sensor in an amount to provide a power dissipation or heat generation in the temperature sensor such that the temperature rise rate of the sensor is substantially similar to the temperature rise rate of the motor winding. Applicant has discovered that this matching of temperature rise rates can be achieved by the practice of this invention and that when these temperature rise rates are substantially similar, temperature overshoot in the motor winding is minimized and a dynamoelectric machine may be satisfactorily protected against both a locked rotor condition and a running overload condition.

These and other objects of this invention will become readily apparent from a consideration of the following detailed description and attached drawing wherein:

The figure is a schematic electrical diagram of a three-phase dynamoelectric machine embodying an over-temperature protection system in accordance with this invention.

Referring particularly to the drawing, there is shown a dynamoelectric machine 10 of the three-phase type having insulated phase windings 11, 12 and 13. Dynamoelectric machine 10 may alternatively comprise a single or multiple phase electric motor or generator of the synchronous or induction type or may comprise any other type of dynamoelectric machine, such as a rotary condenser or electromagnet. For purposes of description, however, dynamoelectric machine 109 will hereinafter be referred to as an electric motor to which this invention is especially suitable.

Motor 10 is connected by suitable conductors to a source of line current represented by line terminals 14, 15 and 16 which supply current to phase windings 11, 12 and 13, respectively. Normally open start relay contacts 17, 18 and 19 are shown in series between terminals 14, 15 and 16 and phase windings 11, 12 and 13, respectively, and serve to connect or disconnect motor 10 from the source of line current.

Associated with motor 10 is an over-temperature protection system comprising an over-temperature protection circuit having a pair of temperature sensitive resistance elements 20 and 22 which are used as temperature sensors and control the operation of a desired over-temperature protection function. In the illustrated embodiment the over-temperature protection function comprises taking motor 10 off the line by opening contacts 17, 18 and 19, but it will be understood that the over-temperature function may involve actuating a temperature indicator or warning light or actuating some device to unload or lessen the load on motor 10, if desired. Likewise, the over-temperature protection function may involve either a variable or step type relay function or a combination of desired functions.

Temperature sensitive resistance elements 20 and 22 may each desirably comprise a positive temperature coefficient thermistor having desired characteristics. The temperature sensitive resistance elements may be directly secured to a perdetermined voltage point or tap, 21 and 23, respectively, on phase windings 11 and 12, respectively. Preferably, resistance elements 20 and 22 are directly soldered to the bare conductor wire of their respective phase windings to provide direct electrical and physical contact between the body of the resistance element and the conductor winding, the insulation of which is to be protected. By directly securing the temperature sensitive resistance element to the conductor winding in the described manner, use of an intermediate conductor wire is eliminated and the thermal lag between a change in temperature of the conductor winding and the resistance element is minimized because of the intimate heat transfer relation which is provided therebetween.

A temperature sensititve resistance element suitable for use herein may desirably comprise a positive temperature coefficient, semi-conducting composition of barium titanite, lanthanum oxide, and strontium titanite formed in a rectangular shape approximately 1/16" x 1/16" x 1/4" in size. A typcial thermistor of the type described may have a resistance at 80° F. of about 200 ohms and a resistance at 220° F. of about 800 ohms. Desirably materials of this type exhibit a very steep temperature-resistance slope over the portion of the resistance-temperature curve which is used to control the over-temperature protection circuit. It will be understood that other types of temperature sensitive resistance elements including negative temperature coefficient thermistors may be employed, if desired, and that while a steep temperature resistance slope is no essential, this characteristic is desirable since it provides a high degree of sensitivity in controlling the over-temperature protection circuit.

Temperature sensitive resistance elements 20 and 22 may be connected as shown in the drawing in a series circuit which includes control relay solenoid 24, a pair of normally open control relay contacts 25 associated with the control relay, and a variable resistance element 26 which is shown in the drawing to be a potentiometer having arm 27 connected to one terminal of the resistance element of the potentiometer. It will be understood that relay 24 may actually comprise any desired circuit such as a semi-conductor circuit or other electronic device for performing the desired over-temperature control function.

Resistance elements 20 and 22 are connected to predetermined voltage taps on phase windings 11 and 12, respectively, which are connected across different phases of the line current source, so that a current will flow through the series circuit described. It will be appreciated that variable resistance element 26 and relay solenoid 24, as well as the conductors connecting them in the series circuit comprise conductance elements. The value of the conductance in the series circuit which includes the temperature sensitive resistance elements can be adjusted by adjusting arm 27 to provide the desired resistance or conductance in the circuit.

A start relay solenoid 30 is connected to line terminals 14 and 15 through a set of normally open contacts 31 of start switch 29 and a set of normally closed contacts 32 of a stop switch. Start switch 29 is also provided with a second set of normally open contacts 33 which are connected in parallel across normally open control relay contacts 25 disposed between control relay solenoid 24 and variable resistance element 26 as shown in the drawing. Start switch 29 is of the momentary make type wherein manual pressure on the start switch momentarily closes contacts 31 and 33 and releasing of pressure on the start switch opens these contacts. Control relay 24 is also provided with a pair of normally open contacts 34 connected in parallel across normally open contacts 31 of start switch 29.

In operation, start switch 29 is manually closed and current flows from line terminal 14 through start relay solenoid 30, start switch contacts 31, stop switch contacts 32 to line terminal 15. Consequently, start relay solenoid 30 is energized thereby closing start relay contacts 17, 18 and 19. Closing of the start relay contacts connects motor 10 across the line placing the motor in operation.

Connecting the motor across the line also causes a current to flow from tap 21 through temperature sensitive resistance element 20, control relay solenoid 24, start switch contacts 33, variable resistance 26, temperature sensitive resistance element 22 to tap 23 while start switch 29 is depressed. Consequently, control relay solenoid 24 is energized, closing control relay contacts 25 and 34. Closing of control relay contacts 34 assures that start relay solenoid 30 will continue to be eenrgized after pressure is removed from momentary start switch 29 and contacts 31 open. Therefore, motor 10 operates normally assuming that it does not experience on starting, an initial locked rotor or other overload condition.

If, at startup, motor 10 experiences a locked rotor condition, or if, during normal operation, an excessively heavy load is experienced by the motor, phase windings 11 and 12 will draw excessively heavy currents and begin to heat up. After phase windings 11 and 12 have heated to a point where the resistance of the temperature sensitive resistance elements 20 and 22, associated in heat transfer relation therewith, has risen to a predetermined resistance condition, the current will be reduced through control relay solenoid 24 to a point where the control relay becomes deenergized. Deenergization of control relay solenoid 24 causes control relay contacts 25 and 34 to open. Opening of control relay contacts 34 deenergizes start relay 30 since, in normal operation, start relay contacts 1 are open due to release of manual pressure on start switch 29. Deenergization of start relay solenoid 30 opens start relay contacts 17, 18 and 19 taking motor 10 off the line. Control relay contacts 25 being normally open assure that motor 10 cannot again be started after having been cooled down without manual pressure again being exerted on start switch 29. It will be apparent that automatic restart of motor 10 could be provided instead, if desired.

Even with the intimate heat transfer that is provided by the temperature sensitive resistance elements 20 and 22 with their respective phase windings 11 and 12 when connected in the manner described, some temperature lag may be experienced before the temperature sensitive resistance elements are heated to the same temperature as the phase windings. This temperature lag is due to the fact that resistance elements 20 and 22 may have a different temperature rise rate characteristic in their operating range than the temperature rise rate of the motor windings 11 and 12 for a particular mass and motor winding contact area which it may be convenient to have in a particular resistance element.

For the reasons previously discussed, it is desirable that the rise rate of the temperature sensitive resistance elements have the same characteristic as the temperature rise rate of the motor windings in order to protect against the rapid rise rate of the motor windings which is experienced during locked rotor conditions, while at the same time permitting normal operation of the motor at as close as possible to its maximum temperature and corresponding horsepower during normal operation.

As previously explained, if the temperature sensitive resistance elements do not have as high a temperature rise rate as the motor windings with which they are associated, effective locked rotor protection will require that the resistance elements deenergize the control relay at a temperature below that which windings 11 and 12 could safely reach, in order to compensate for the overshoot in temperature of the motor windings due to the differing rise rates. While this may be satisfactory to protect against locked rotor conditions, the adjusting of the circuit component values and characteristics so that resistance elements 20 and 22 deenergize the control relay when they reach a lower than maximum winding temperature will result in limiting the maximum power that may be delivered by motor 10 during normal operation when little or no temperature lag is experienced between the resistance elements and the motor winding.

In order, therefore, to obtain maximum sensitivity from the motor protection system described, and to eliminate any substantial temperature lag between the temperature sensitive resistance elements and the motor windings, means are provided for adjusting or trimming the temperature rise rate of the resistance elements so that it is closely similar to the temperature rise rate of the motor windings. This is achieved by adjusting variable resistance element 26 to provide a predetermined normal current flow through temperature sensitive resistance elements 20 and 22 selected so as to provide a predetermined power dissipation therein. The mount of current flow and consequent power dissipation in the resistance elements is selected so that the temperature rise rate characteristic of the resistance elements is closely similar to the temperature rise rate of the motor windings.

It will be understood that variable resistance element 26 has been shown in the drawing for convenience in illustrating the means for adjusting the conductance and corresponding current flow and power dissipation in temperature sensitive resistance elements 20 and 22. In practice, the value of conductance for this circuit may be determined mathematically or experimentally and the resistance values of the temperature sensitive resistance elements and the impedance of control relay solenoid 24 may be chosen to provide the desired power dissipation for a motor winding of known temperature rise characteristics. On the other hand, it may be desirable to actually use a variable resistance element 26, as shown in the drawing, in certain applications, particularly if the characteristics of all of the circuit values are not completely known and if it is desired to trim the circuit for optimum sensitivity.

If the circuit component values are determined, it is possible to provide the desired current flow and consequent power dissipation in the temperature sensitive resistance elements by proper selection of the voltage tap on the motor windings to which the resistance elements are soldered thereby permitting the use of a fixed resistance element in place of variable resistor 26, or permitting the elimination of the resistance element altogether. The exact voltage, current, and conductance or resistance values of the circuit can be determined to provide a particular temperature rise rate to match the temperature rise rate of a particular motor. In many cases, it is convenient to control the conductance and thermal characteristics of the circuit by providing physical dimensions, mass and a wire contact area for the resistance elements to give the desired current flow and rise rate characteristics, and all of these methods of providing or adjusting the conductance of the circuit are contemplated within the scope of this invention.

As an example, a 10 hp. random wound induction motor having a temperature rise rate of about 16° F. per second and a desired maximum winding temperature of about 260° F. may be protected by soldering a positive temperature coefficient thermistor of about 1/16" x 1/16" x 1/4" to an 80 volt tap in series with a relay of about 300 ohms impedance and a variable resistance of 0–250 ohms. The thermistor may desirably have a resistance at 80° F. of about 200 ohms and a resistance at 220° F. of about 800 ohms. Under these conditions, the thermistor temperature rise rate can be approximately one-half the rise rate of the motor winding with about 100 milliamperes current through the thermistors which gives sufficiently close matching of the motor and thermistor rise rates to provide satisfactory over-temperature protection when the relay is adjusted to cut out at a thermistor temperature corresponding to about 220° F. It will be seen, therefore, that the overshoot in temperature in this instance is limited to only about 40° F. by the practice of this invention.

As previously explained, the temperature rise rate of the thermistor is adjusted to be substantially similar to the temperature rise rate of the motor winding, but it will be appreciated that as used herein the term "substantially similar" is dependent upon the degree of similarity which is necessary to provide the desired motor protection. In practice, a temperature sensor rise rate of about one-half the temperature rise rate of the motor or greater up to that of the motor winding has been found to be substantially and sufficiently similar to that of the motor so that satisfactory motor protection is obtained. However, the temperature rise rate of the temperature sensor should not be less than about one third that of the motor winding if satisfactory protection is to be obtained. Also, the temperature rise rate of the thermistor or other temperature sensitive resistance element should not be greater than that of the motor winding or the over-temperature protection circuit will be actuated unnecessarily. Consequently, "sufficiently similar" may be understood to mean having a rise rate greater than about one-third but no greater than that of the temperature rise rate of the motor winding. In adjusting the temperature rise rate of the temperature sensitive resistance element, it is preferred that the bias current through the resistance element remain generally below a value of current which produces sufficient heating to substantially change the value of resistance of the temperature sensitive resistance element so that the entire steep voltage-resistance curve of the thermistor may be utilized in the over-temperature protection control function. For this reason, positive temperature coefficient thermistors are particularly desirable because they characteristically have little change in resistance over a certain temperature range above which they exhibit a steep change in resistance which can be used for control purposes.

Various methods may be used to determine the desired power dissipation in the temperature sensitive resistance elements to closely match their rise rate to a particular motor winding, for example, if as is usually the case the temperature rise rate of the motor winding is known, a family of curves can be plotted for various values of power dissipation in the resistance elements and the desired circuit conductance and voltage tap chosen to give the desired rise rate.

It will be appreciated that many semi-conductor materials which are suitable for resistance elements of the type utilized herein have a limited control or operating range of steep temperature-resistance values and that it may be necessary to modify the physical shape of a particular material or to select a material which is capable of providing the desired rise rate within this steep resistance range without exceeding the current which the resistance element is capable of safely delivering without deterioration or other breakdown.

Instead of the preferred embodiment illustrated wherein positive temperature coefficient resistance elements are utilized as the temperature sensor and control element for the over-temperature protection circuit, it is also possible to utilize negative temperature coefficient resistance elements which can control the over-temperature protection circuit. The over-temperature protection circuit could, for example, comprise a warning light in series with a negative temperature coefficient thermistor soldered to a predetermined desired voltage tap on the motor winding so as to provide a visual over-temperature protection warning upon the existence of a predetermined excessive temperature in a circuit selected to have the proper conductance to provide the desired similarity in temperature rise rates for the temperature sensor and motor winding. Likewise, the temperature sensor may be embedded in the winding of the dynamoelectric machine or at some other location, such as on the core, and insulated therefrom because the practice of this invention provides a means for compensating for the normal temperature lag by suitable adjustment of the temperature rise rate of the temperature sensor. However, it is preferred to directly connect the temperature sensor to the dynamoelectric machine winding because it is found that this provides especially accurate, reproducible and sensitive temperature sensing.

Various other modifications and embodiments of this invention will readily occur to those skilled in the art. It will, therefore, be understood that this invention is not limited to the specific described embodiments thereof but may be otherwise embodied within the scope of the following claim.

I claim:

An over-temperature protection system for a dynamoelectric machine having a winding therein comprising: an over-temperature protection circuit for protecting said winding of said dynamoelectric machine from the continuation of an excessive current flow therethrough; a temperature sensitive resistance element secured to said winding in direct electrical and physical contact therewith, said temperature sensitive resistance element having only a single conductor lead extending therefrom, and said single conductor lead being electrically connected to said over-temperature protection circuit to trigger said circuit to a condition which prevents the continuance of excessive current flow through said winding upon the occurrence of a predetermined passage of current from said winding, through said resistance element and said conductor to said over-temperature protection circuit; and electrical conductance means connected to provide a continuous predetermined current from said winding being protected through said conductor, and said temperature sensitive resistance element when current is passing through said winding, to preheat said resistance element, said conductance being of a predetermined magnitude to provide a current through said resistance element and a power dissipation therein to heat said resistance element to an extent such that it exhibits a temperature rise rate of similar magnitude to the temperature rise rate of said dynamoelectric machine winding being protected, to thereby cause said resistance element to respond to temperature changes of said winding in a closely similar way to that of the winding.

References Cited by the Examiner

UNITED STATES PATENTS

| | | | |
|---|---|---|---|
| 3,032,690 | 5/1962 | Elliott | 317—41 |
| 3,036,242 | 5/1962 | MacGregor | 317—13 |
| 3,079,524 | 2/1963 | Gibson et al. | 317—41.1 |
| 3,205,405 | 9/1965 | Resh. | |
| 3,209,206 | 9/1965 | Courtin. | |

MILTON O. HIRSHFIELD, *Primary Examiner.*

SAMUEL BERNSTEIN, STEPHEN W. CAPELLI,
*Examiners.*

R. V. LUPO, *Assistant Examiner.*